US012542842B2

(12) United States Patent
Lee et al.

(10) Patent No.: US 12,542,842 B2
(45) Date of Patent: Feb. 3, 2026

(54) WEARABLE ELECTRONIC DEVICE AND OPTICAL FILM APPLIED THERETO

(71) Applicant: SAMSUNG ELECTRONICS CO., LTD., Suwon-si (KR)

(72) Inventors: Jeahyuck Lee, Suwon-si (KR); Hyunguk Yoo, Suwon-si (KR); Injo Jeong, Suwon-si (KR); Seongwook Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 148 days.

(21) Appl. No.: 18/244,054

(22) Filed: Sep. 8, 2023

(65) Prior Publication Data

US 2023/0421680 A1 Dec. 28, 2023

Related U.S. Application Data

(63) Continuation of application No. PCT/KR2022/002215, filed on Feb. 15, 2022.

(30) Foreign Application Priority Data

Mar. 10, 2021 (KR) .................. 10-2021-0031206

(51) Int. Cl.
*H04M 1/02* (2006.01)
*G06V 40/13* (2022.01)

(52) U.S. Cl.
CPC ...... *H04M 1/0277* (2013.01); *G06V 40/1318* (2022.01); *H04M 2250/12* (2013.01)

(58) Field of Classification Search
CPC .......................... H04M 1/0277; G06V 40/1318

USPC ............................................. 428/98
See application file for complete search history.

(56) References Cited

U.S. PATENT DOCUMENTS

| 8,779,361 | B2 | 7/2014 | Costello et al. |
| 10,078,777 | B2 | 9/2018 | Kim et al. |
| 10,191,455 | B2 | 1/2019 | Shim et al. |
| 10,557,976 | B2 | 2/2020 | Smith et al. |

(Continued)

FOREIGN PATENT DOCUMENTS

| CN | 105982654 A | 10/2016 |
| JP | 2012-182380 A | 9/2012 |

(Continued)

OTHER PUBLICATIONS

International Search Report & Written Opinion (PCT/ISA/210 & 237) issued May 10, 2022 from the International Searching Authority in International Application No. PCT/KR2022/002215.

*Primary Examiner* — Tahseen Khan
(74) *Attorney, Agent, or Firm* — Sughrue Mion, PLLC

(57) ABSTRACT

An electronic device includes: a display; a cover comprising a light transmissive area; a printed circuit board provided under the cover; a sensor module comprising a light emitting unit and a light receiving unit, the sensor module being provided on the printed circuit board; and an optical film provided between the sensor module and the cover, wherein the optical film includes: a base layer; a pattern layer provided on the base layer, the pattern layer comprising at least one pattern protruding in directions different from each other; and an absorption layer comprising a material having a high light absorption rate, the absorption layer being provided on a partial area of the pattern layer.

9 Claims, 11 Drawing Sheets

(56) References Cited

U.S. PATENT DOCUMENTS

| | | |
|---|---|---|
| 2010/0282953 A1 | 11/2010 | Tam |
| 2016/0378071 A1 | 12/2016 | Rothkopf |
| 2017/0164848 A1 | 6/2017 | Nadeau et al. |
| 2018/0228414 A1* | 8/2018 | Shao .................. A61B 5/02427 |
| 2019/0090806 A1* | 3/2019 | Clavelle ............. A61B 5/02438 |
| 2019/0137822 A1 | 5/2019 | Gwon et al. |
| 2019/0192004 A1 | 6/2019 | Matsuo et al. |
| 2020/0323489 A1 | 10/2020 | Kim et al. |

FOREIGN PATENT DOCUMENTS

| | | |
|---|---|---|
| KR | 10-2010-0120270 A | 11/2010 |
| KR | 10-2017-0080108 A | 7/2017 |
| KR | 10-2018-0016866 A | 2/2018 |
| KR | 10-1926648 B1 | 12/2018 |
| KR | 10-1942499 B1 | 1/2019 |
| KR | 10-2019-0108527 A | 9/2019 |
| KR | 10-2020-0024300 A | 3/2020 |
| KR | 10-2020-0120407 A | 10/2020 |
| KR | 10-2021-0029625 A | 3/2021 |

* cited by examiner

WEARABLE ELECTRONIC DEVICE AND OPTICAL FILM APPLIED THERETO

CROSS-REFERENCE TO RELATED APPLICATIONS

This application is a by-pass continuation application of International Application No. PCT/KR2022/002215, filed on Feb. 15, 2022, which is based on and claims priority to Korean Patent Application No. 10-2021-0031206, filed on Mar. 10, 2021, in the Korean Intellectual Property Office, the disclosures of which are incorporated by reference herein their entireties.

BACKGROUND

1. Field

The disclosure relates to a wearable electronic device and an optical film applied thereto.

2. Description of Related Art

Functions of a wearable electronic device (e.g., a wrist watch) are gradually diversifying. In addition, the size of the wearable electronic device is gradually decreasing.

As interests in health increase, functions capable of measuring human biometric information are provided in the wearable electronic device. Recently, various sensors, such as a heart rate sensor, are mounted on the wearable electronic device.

Various electronic parts that enable the wearable electronic device to perform various functions may be provided in or connected to a printed circuit board (PCB) or a flexible printed circuit board (FPCB).

A sensor module of the wearable electronic device may include a sensor including a light emitting unit and a light receiving unit. In order for such sensor to accurately detect a user's body information, it may be necessary to minimize a phenomenon in which light produced from the light emitting unit is transmitted to the light receiving unit without being reflected by the body.

An optical film of a wearable electronic device may be a film for improving optical characteristics of the sensor. The conventional optical film may be divided into an optical film applied to a light emitting unit of a sensor and an optical film applied to a light receiving unit of the sensor, respectively, to be applied to the wearable electronic device. For this reason, manufacturing costs of the wearable electronic device may increase, the manufacturing yield may decrease, and the mass productivity may deteriorate.

SUMMARY

One or more embodiments disclosed herein are intended to provide an optical film which improves optical characteristics of a sensor so that the sensor including a light emitting unit and a light receiving unit accurately measure a user's biometric information and is configured by a single sheet covering both the light emitting unit and the light receiving unit of the sensor, and an electronic device to which the optical film is applied.

According to an aspect of the disclosure, an electronic device includes: a display; a cover comprising a light transmissive area; a printed circuit board provided under the cover; a sensor module comprising a light emitting unit and a light receiving unit, the sensor module being provided on the printed circuit board; and an optical film provided between the sensor module and the cover, wherein the optical film includes: a base layer; a pattern layer provided on the base layer, the pattern layer comprising at least one pattern protruding in directions different from each other; and an absorption layer comprising a material having a high light absorption rate, the absorption layer being provided on a partial area of the pattern layer.

Patterns of the pattern layer of the optical film may protrude in forms of concentric circles having different diameters with respect to a surface of the pattern layer.

The pattern layer of the optical film may include: a first area facing the light emitting unit of the sensor module, a second area facing the light receiving unit of the sensor module, and a third area provided between the first area and the second area, wherein a first pattern of the first area and a second pattern of the second area protrudes in directions different from each other with respect to the surface of the pattern layer, and wherein the first pattern and a third pattern of the third area protrude in the same direction with respect to the surface of the pattern layer.

The absorption layer of the optical film may be provided on the third area of the pattern layer.

The absorption layer of the optical film may be provided on a fourth area which is an outer area of the third area of the pattern layer.

The first pattern of the pattern layer of the optical film may be configured to travel first light in a first direction substantially perpendicular to an extension direction of the pattern layer, the first light being incident from the light emitting unit of the sensor module to the first pattern, wherein the second pattern of the pattern layer of the optical film is configured to travel second light in a second direction opposite to the first direction, the second light being incident from the light emitting unit of the sensor module to the second pattern, and wherein the third pattern of the pattern layer of the optical film is configured to guide third light to the absorption layer, the third light being incident from the light emitting unit of the sensor module to the third pattern.

The first pattern of the pattern layer of the optical film may include: a first surface, and a second surface located farther from a center of the pattern layer than the first surface of the first pattern, wherein an angle between the first surface of the first pattern and the surface of the pattern layer is smaller than an angle between the second surface of the first pattern and the surface of the pattern layer, wherein the second pattern of the pattern layer of the optical film includes: a first surface, and a second surface located farther from the center of the pattern layer than the first surface of the second pattern, wherein an angle between the first surface of the second pattern and the surface of the pattern layer is greater than an angle between the second surface of the second pattern and the surface of the pattern layer, wherein the third pattern of the pattern layer of the optical film includes: a first surface, and a second surface located farther from the center of the pattern layer than the first surface of the third pattern, wherein an angle between the first surface of the third pattern and the surface of the pattern layer is an acute angle, and wherein an angle between the second surface of the third pattern and the surface of the pattern layer is an obtuse angle.

The angle between the first surface of the first pattern and the surface of the pattern layer may decrease as a distance between the first surface of the first pattern and the center of the pattern layer increases.

The electronic device may further include: a light blocking partition wall extending from the printed circuit board to the optical film to divide: a light emitting area, in which the light emitting unit of the sensor module is mounted on the printed circuit board, and a light receiving area, in which the light receiving unit of the sensor module is mounted on the printed circuit board, wherein the first area of the pattern layer of the optical film faces the light emitting area, wherein the second area of the pattern layer of the optical film faces the light receiving area, and wherein the third area is in contact with the light blocking partition wall.

The absorption layer of the optical film may be provided between the light blocking partition wall and the pattern layer.

The optical film may be attached to be in contact with the cover in order to prevent a space from being formed between the cover and the optical film.

According to another aspect of the disclosure, an optical film includes: a base layer; a pattern layer provided on the base layer, the pattern layer includes at least one pattern protruding in directions different from each other; and an absorption layer including a material having a high light absorption rate, the absorption layer being provided on a partial area of the pattern layer, wherein the pattern layer includes a first area, a second area spaced apart from the first area, and a third area provided between the first area and the second area, wherein a first pattern of the first area and a second pattern of the second area are protruding in directions different from each other with respect to a surface of the pattern layer, and wherein the first pattern and a third pattern of the third area protruding in the same direction with respect to the surface of the pattern layer.

Patterns of the pattern layer may protrude in forms of concentric circles having different diameters with respect to the surface of the pattern layer.

The first pattern of the pattern layer may include a first surface and a second surface located farther from a center of the pattern layer than the first surface of the first pattern, wherein an angle between the first surface of the first pattern and the surface of the pattern layer is smaller than an angle between the second surface of the first pattern and the surface of the pattern layer, wherein the second pattern of the pattern layer includes a first surface and a second surface located farther from the center of the pattern layer than the first surface of the second pattern, wherein an angle between the first surface of the second pattern and the surface of the pattern layer is greater than an angle between the second surface of the second pattern and the surface of the pattern layer, wherein the third pattern of the pattern layer includes a first surface and a second surface located farther from the center of the pattern layer than the first surface of the third pattern, wherein an angle between the first surface of the third pattern and the surface of the pattern layer is an acute angle, and wherein an angle between the second surface of the third pattern and the surface of the pattern layer is an obtuse angle.

The angle between the first surface of the first pattern and the surface of the pattern layer may decrease as a distance between the first surface of the first pattern and the center of the pattern layer increases.

According to one or more embodiments disclosed herein, more accurate biometric information may be obtained by reducing the amount of light directly incident from a light emitting unit to a light receiving unit by an optical film.

BRIEF DESCRIPTION OF THE DRAWINGS

In relation to descriptions of the drawings, the same or similar reference numerals may be used for the same or similar elements. The above and other aspects, features, and advantages of certain embodiments of the disclosure will be more apparent from the following description taken in conjunction with the accompanying drawings, in which.

DETAILED DESCRIPTION

Figure 1:
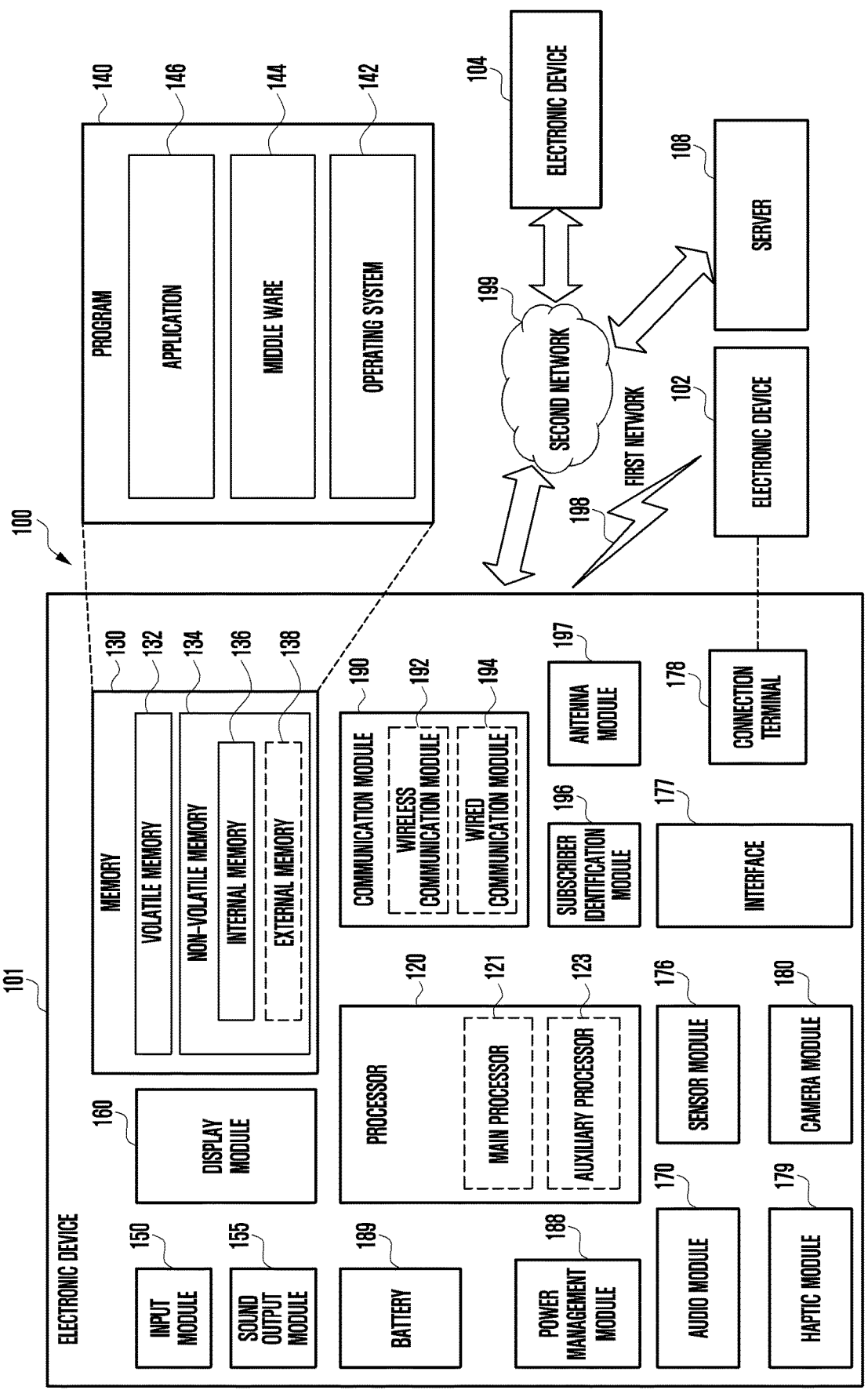
FIG. 1 is a block diagram of an electronic device in a network environment, according to one or more embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern of or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
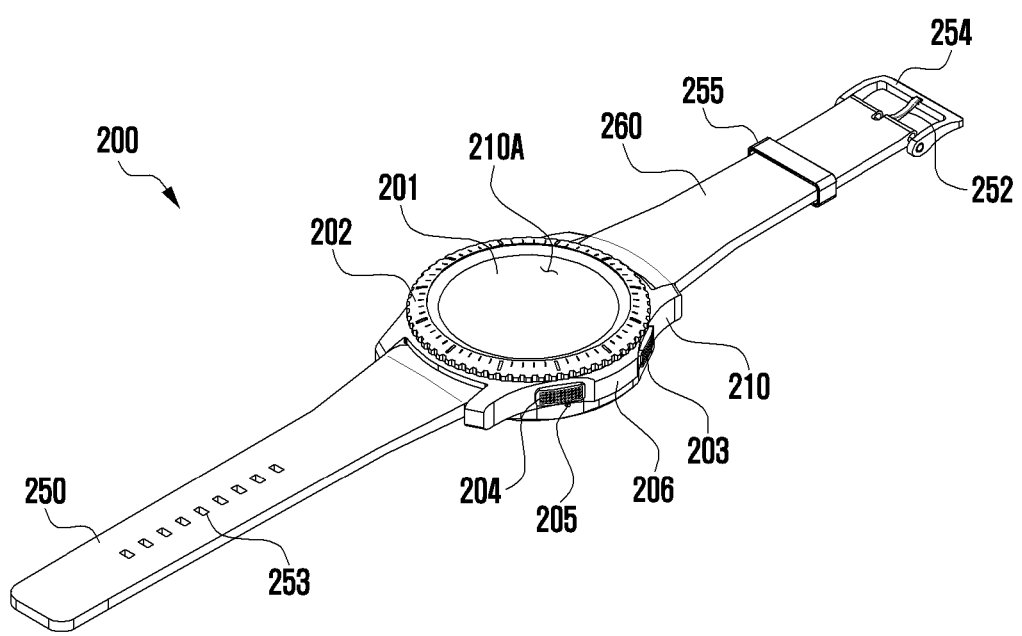
FIG. 2 is a perspective view of a front surface of a mobile electronic device according to one or more embodiments disclosed herein.
Figure 3:
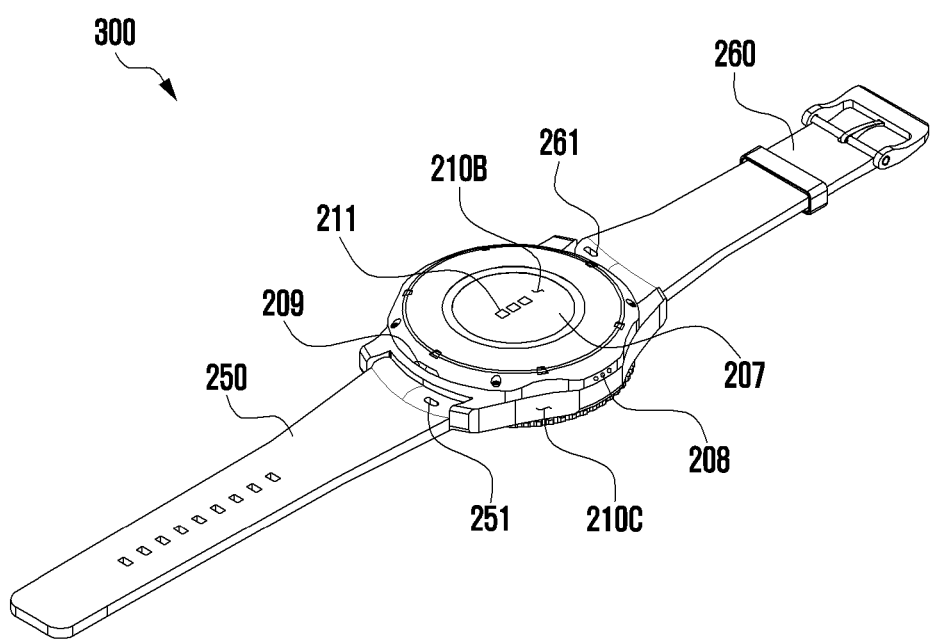
FIG. 3 is a perspective view of a rear surface of the electronic device of FIG. 2.

Referring to FIGS. 2 and 3, an electronic device 200 according to an embodiment may include a housing 210 including a first surface (or a front surface) 210A, a second surface (or a rear surface) 210B, and a lateral surface surrounding a space between the first surface 210A and the second surface 210B, and coupling members 250 and 260 configured to be connected to at least a part of the housing 210 and allow the electronic device 200 to be detachably coupled to a part (e.g., the wrist, the ankle, etc.) of a user's body. In another embodiment (not shown), the housing may refer to a structure which forms a part among the first surface 210A, the second surface 210B, and the lateral surface 210C of FIG. 2. According to an embodiment, at least a part of the first surface 210A may be formed by a substantially transparent front plate 201 (e.g., a polymer plate or a glass plate including various coating layers). The second surface 210B may be formed by a substantially opaque rear plate 207. The rear plate 207 may be formed of, for example, coated or colored glass, ceramic, polymer, metal (e.g., aluminum, stainless steel (STS), or magnesium), or a combination of at least two of the above-described materials. The lateral surface 210C may be formed by a side bezel structure (or "a lateral surface member") 206 coupled to the front plate 201 and the rear plate 207 and including metal and/or polymer. In an embodiment, the rear plate 207 and the side bezel structure 206 may be integrally formed and may include the same material (e.g., a metal material such as aluminum). The coupling members 250 and 260 may be formed of various materials and in various forms. Integral unit link and a plurality of unit links may be mutually flexible by woven fabric, leather, rubber, urethane, metal, ceramic, or a combination of at least two of the above materials.

According to an embodiment, the electronic device 200 may include at least one among a display 220 (see FIG. 4), audio modules 205 and 208, a sensor module 211, key input devices (a wheel key 202 and side key buttons 203, 204), and a connector hole 209. In an embodiment, the electronic device 200 may omit at least one element among the above elements or may additionally include another element.

The display 220 may be exposed, for example, via a considerable portion of the front plate 201. The form of the display 220 may be a form corresponding to the form of the front plate 201, and may be various forms such as a circle, an ellipse, or a polygon. The display 220 may be coupled, provided, or disposed adjacent to a touch detection circuit, a pressure sensor capable of measuring the intensity (pressure) of a touch, and/or a fingerprint sensor.

The audio modules may include a microphone hole 205 and a speaker hole 208. With respect to the microphone hole 205, a microphone for acquiring external sound may be disposed or provided therein, and in an embodiment, a plurality of microphones may be arranged to detect the direction of sound. The speaker hole 208 may be used as an external speaker and a receiver for calls.

The sensor module 211 may produce an electrical signal or data value corresponding to an internal operating state of the electronic device 200 or an external environmental state. The sensor module 211 may include, for example, a biometric sensor module (e.g., an HRM sensor) disposed or provided on the second surface 210B of the housing 210. The electronic device 200 may further include a sensor module not shown, for example, at least one among a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, and an illuminance sensor.

The key input devices may include a wheel key 202 disposed or provided on the first surface 210A of the housing 210 to be rotatable in at least one direction and/or side key buttons 203 and 204 arranged on the lateral surface 210C of the housing 210. The wheel key may have a form corresponding to the form of the front plate 201. In another embodiment, the electronic device 200 may not include some or all of the key input devices (the wheel key 202 and side key buttons 203, 204) mentioned above, the key input devices (the wheel key 202 and side key buttons 203, 204) which are not included may be implemented on the display 220 in other forms such as a soft key. The connector hole 209 may accommodate a connector (e.g., a USB connector) for transmitting and receiving power and/or data to and from an external electronic device and may include another connector hole (not shown) capable of accommodating a connector for transmitting and receiving an audio signal to and from an external electronic device. The electronic device 200 may further include, for example, a connector cover (not shown) for covering at least a part of the connector hole 209 and blocking external foreign matter from entering the connector hole.

The coupling members 250 and 260 may be detachably coupled to at least some areas of the housing 210 by using locking members 251 and 261. The coupling members 250 and 260 may include one or more among a holding member 252, a holding member fastening hole 253, a band guide member 254, and a band holding ring 255.

The holding member 252 may be configured to hold the housing 210 and the coupling members 250 and 260 to a part of a user's body (e.g., the wrist, the ankle, etc.). Corresponding to the holding member 252, the holding member fastening hole 253 may hold the housing 210 and the coupling members 250 and 260 to a part of the user's body. When the holding member 252 is fastened to the holding member fastening hole 253, the band guide member 254 may be configured to limit the movement range of the holding member 252, so that the coupling members 250 and 260 may be closely coupled and attached to a part of the user's body. The band holding ring 255 may limit the movement range of the coupling members 250 and 260 in a state in which the holding member 252 and the holding member fastening hole 253 are fastened to each other.

Figure 4:
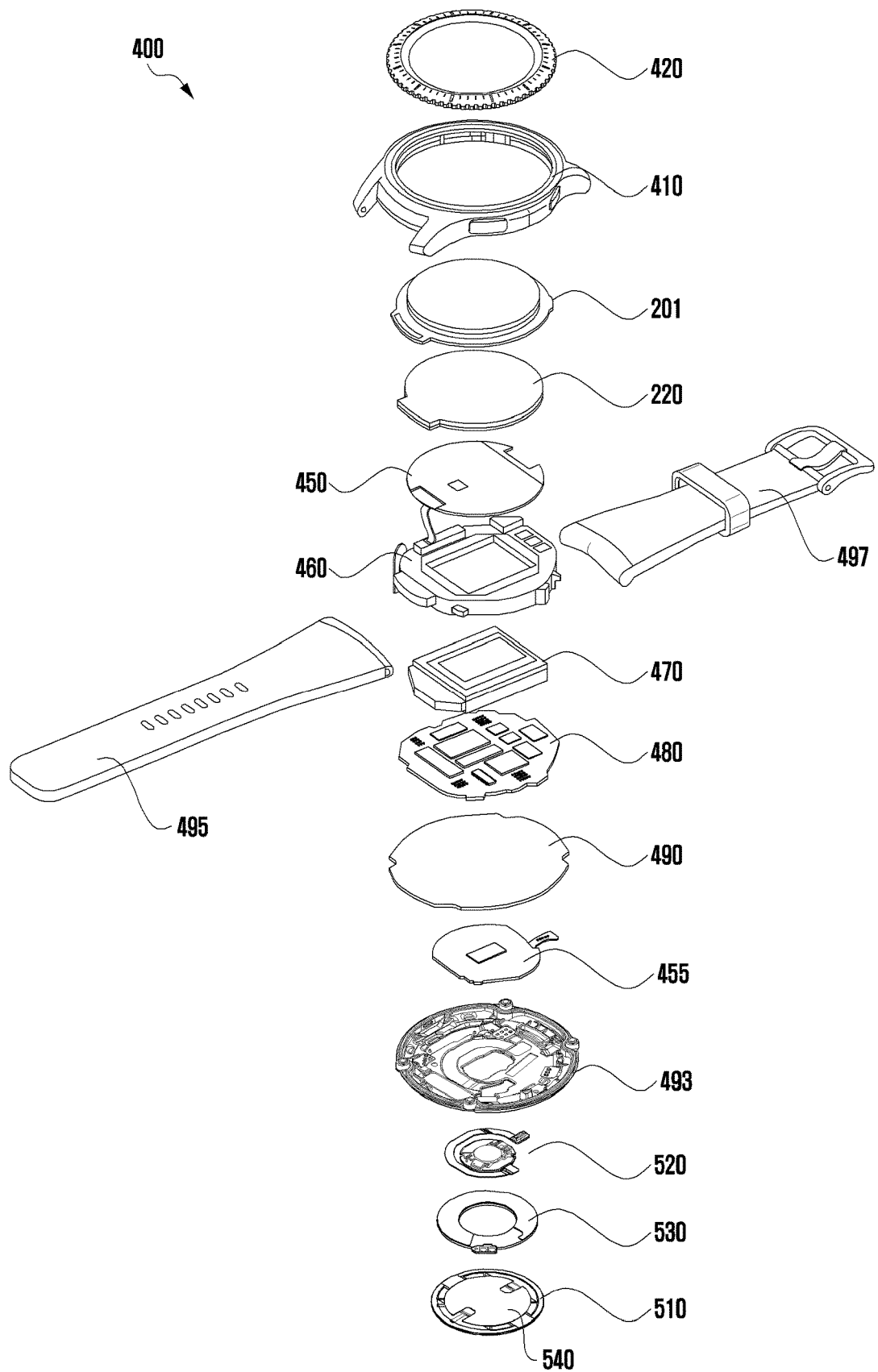
FIG. 4 is an exploded perspective view of the electronic device of FIG. 2.

Referring to FIG. 4, an electronic device 400 may include a side bezel structure 410, a wheel key 420, a front plate 201, a display 220, a first antenna 450, a second antenna 455, a support member 460 (e.g., a bracket), a battery 470, a printed circuit board 480, a sealing member 490, a rear plate 493, and coupling members 495 and 497. At least one of the elements of the electronic device 400 may be the same as or similar to at least one of the elements of the electronic device 200 of FIG. 2 or 3, and duplicate descriptions will be omitted below. The support member 460 may be disposed or provided inside the electronic device 400 to be connected to the side bezel structure 410 or integrally formed with the side bezel structure 410. The support member 460 may be formed of, for example, a metal material and/or a non-metal (e.g., polymer) material. The support member 460 may have one surface coupled to the display 220 and the other surface coupled to the printed circuit board 480. A processor, a memory, and/or an interface may be mounted on the printed circuit board 480. The processor may include, for example, one or more among a central processing unit, an application processor, a graphic processing unit (GPU), an application processor signal processing unit, or a communication processor.

The memory may include, for example, a volatile memory or a non-volatile memory. The interface may include, for example, a high definition multimedia interface (HDMI), a universal serial bus (USB) interface, an SD card interface, and/or an audio interface. For example, the interface may electrically or physically connect the electronic device 400 to an external electronic device, and may include a USB connector, an SD card/MMC connector, or an audio connector.

The battery 470, which is a device for supplying electrical power to at least one element of the electronic device 400, may include, for example, a non-rechargeable primary cell, a rechargeable secondary cell, or a fuel cell. At least a part of the battery 470 may be disposed or provided, for example, on a plane substantially the same as the printed circuit board 480. The battery 470 may be integrally disposed or provided inside the electronic device 200, and may be detachably disposed or provided in the electronic device 200.

The first antenna 450 may be disposed or provided between the display 220 and the support member 460. The first antenna 450 may include, for example, a near field communication (NFC) antenna, a wireless charging antenna, and/or a magnetic secure transmission (MST) antenna. The first antenna 450 may, for example, perform short-range communication with an external device or wirelessly transmit and receive power required for charging, and may transmit a short-range communication signal or a magnetic-based signal including payment data. In another embodiment, an antenna structure may be formed by a part of the side bezel structure 410 and/or the support member 460 or a combination thereof.

The second antenna 455 may be disposed or provided between a circuit board 480 and the rear plate 493. The second antenna 455 may include, for example, a near field communication (NFC) antenna, a wireless charging antenna, and/or a magnetic secure transmission (MST) antenna. The second antenna 455 may, for example, perform short-range communication with an external device or wirelessly transmit and receive power required for charging, and may transmit a short-range communication signal or a magnetic-based signal including payment data. In another embodiment, an antenna structure may be formed by a part of the side bezel structure 410 and/or the rear plate 493 or a combination thereof.

The sealing member 490 may be located between the side bezel structure 410 and the rear plate 493. The sealing member 490 may be configured to block moisture and foreign matter introduced into a space surrounded by the side bezel structure 410 and the rear plate 493 from the outside.

Figure 5:
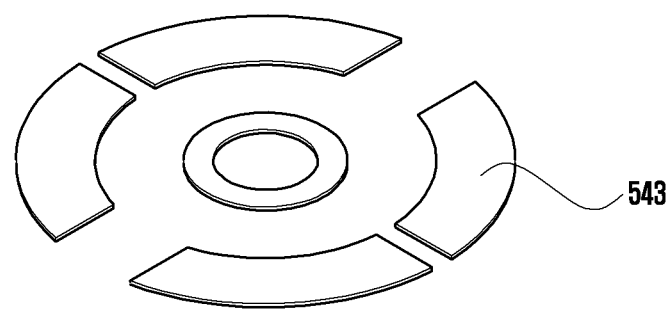
FIG. 5 is an exploded perspective view of an optical film according to one or more embodiments disclosed herein.
Figure 5:
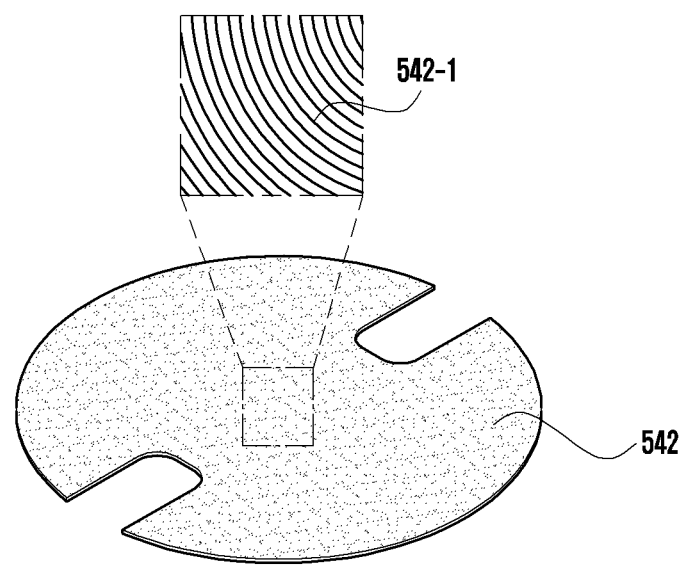
Figure 5:
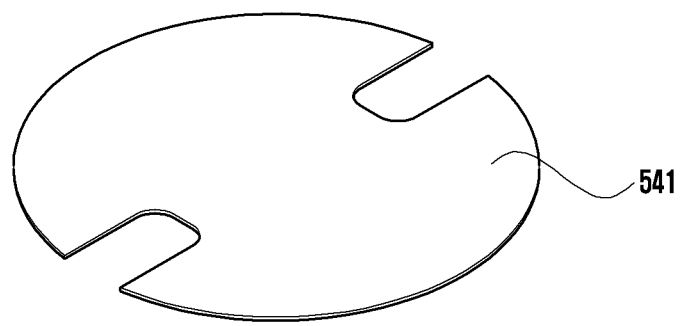

FIG. 5 is an exploded perspective view of an optical film (e.g., the optical film 540 of FIG. 4) according to one or more embodiments disclosed herein.

According to one or more embodiments, an optical film 540 may include a base layer 541, a pattern layer 542, and an absorption layer 543. For example, the optical film 540 may be stacked or provided in the order of the base layer 541—the pattern layer 542—the absorption layer 543, as shown in FIG. 5. The stacking structure and form of the optical film 540 shown in FIG. 5 is merely an example, and may be variously changed according to a design factor such as a form of an element to which the optical film 540 is attached. In some cases, it may be possible to configure the optical film 540 by omitting some of the elements of the optical film 540 described above or by adding another element (another layer).

According to one or more embodiments, the base layer 541 may be made of a material such as polyethylene terephthalate (PET). In addition, the base layer 541 may be formed of various light transmissive materials. The shape of the base layer 541 is not limited to the shape shown in FIG. 5 and may be variously changed. In an embodiment, the base layer 541 may be formed of an adhesive material. The base layer 541 may be formed of a polymer material having adhesive properties. In an embodiment, the base layer 541 may be formed of an adhesive material having high light transmittance. For example, the base layer 541 may be formed of a material such as optical clear adhesive (OCA).

According to one or more embodiments, the pattern layer 542 may be stacked or provided on the base layer 541. According to one or more embodiments, the pattern layer 542 may be of a printing manner by using ultra violet (UV) curable resin. In addition, the pattern layer 542 may be formed by a selective etching method, in a manner of leaving only necessary shapes. The pattern layer 542 may be formed of various materials.

In an embodiment, the pattern layer 542 may be formed on a part of the base layer 541. This may be understood as the pattern layer 542 is formed on the base layer 541. For example, the pattern layer 542 may be formed by processing a part of a surface of the base layer 541.

In an embodiment, the pattern layer 542 may include patterns 542-1 protruding in forms of concentric circles having different diameters with respect to the surface of the pattern layer 542. FIG. 5 is merely an example of the pattern layer 542, and the overall shape of the pattern layer 542 may be variously changed. According to one or more embodiments, the pattern layer 542 may be a part of the base layer 541. For example, a surface of the base layer 541 may be processed by a process such as etching to form the pattern layer 542.

Figure 6A:
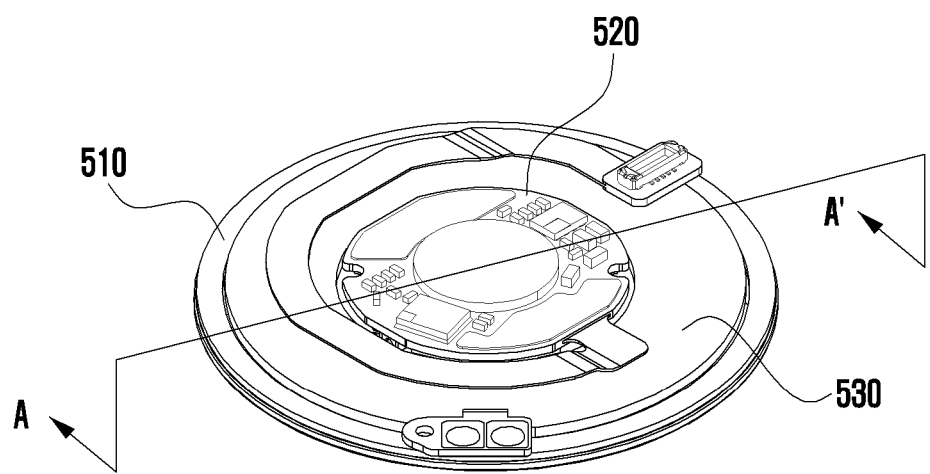
FIG. 6A is a perspective view of a state in which a sensor module and peripheral elements thereof are coupled to each other according to one or more embodiments disclosed herein.
Figure 6B:
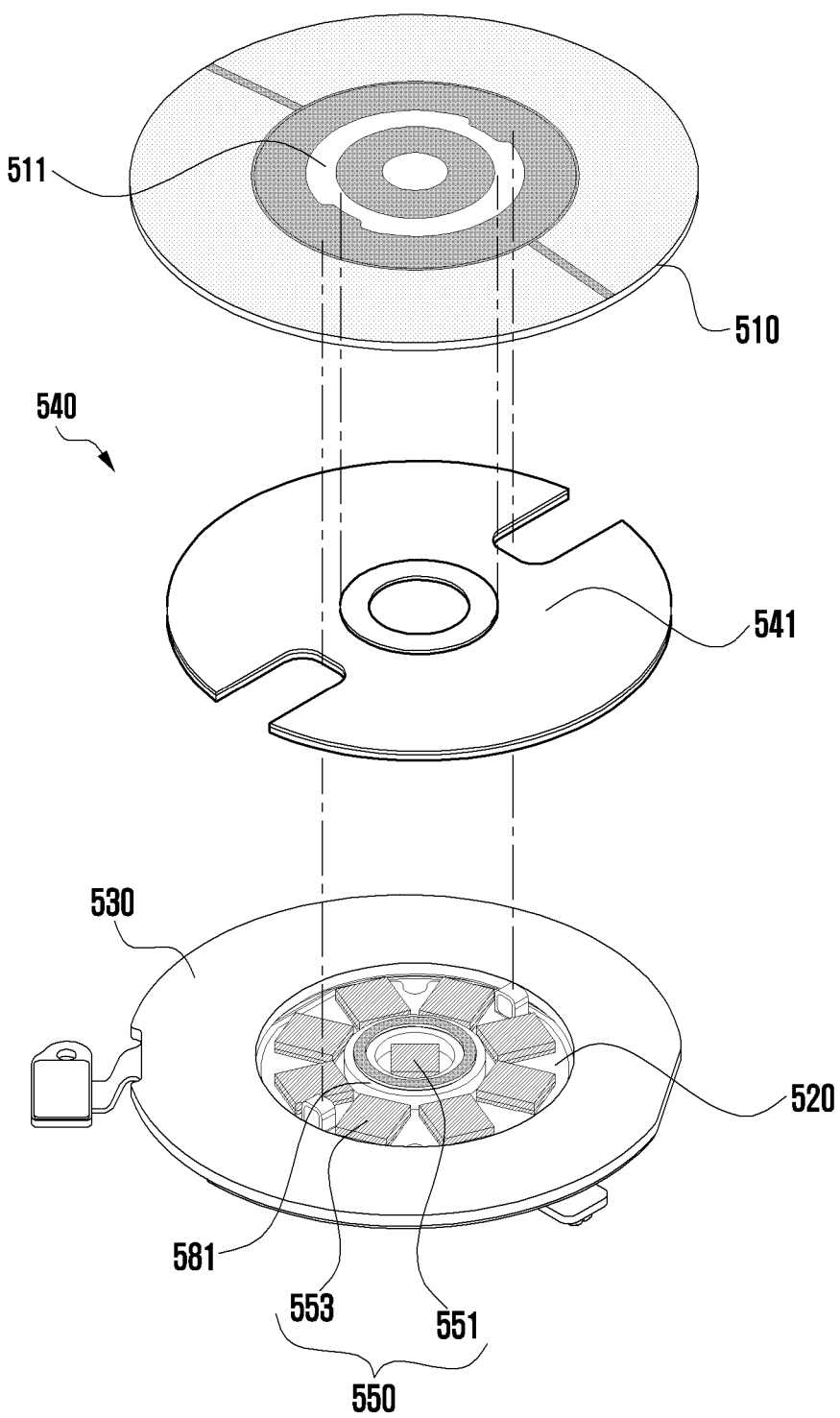
FIG. 6B is an exploded perspective view of the sensor module and the peripheral elements disclosed in FIG. 6A.
Figure 6C:
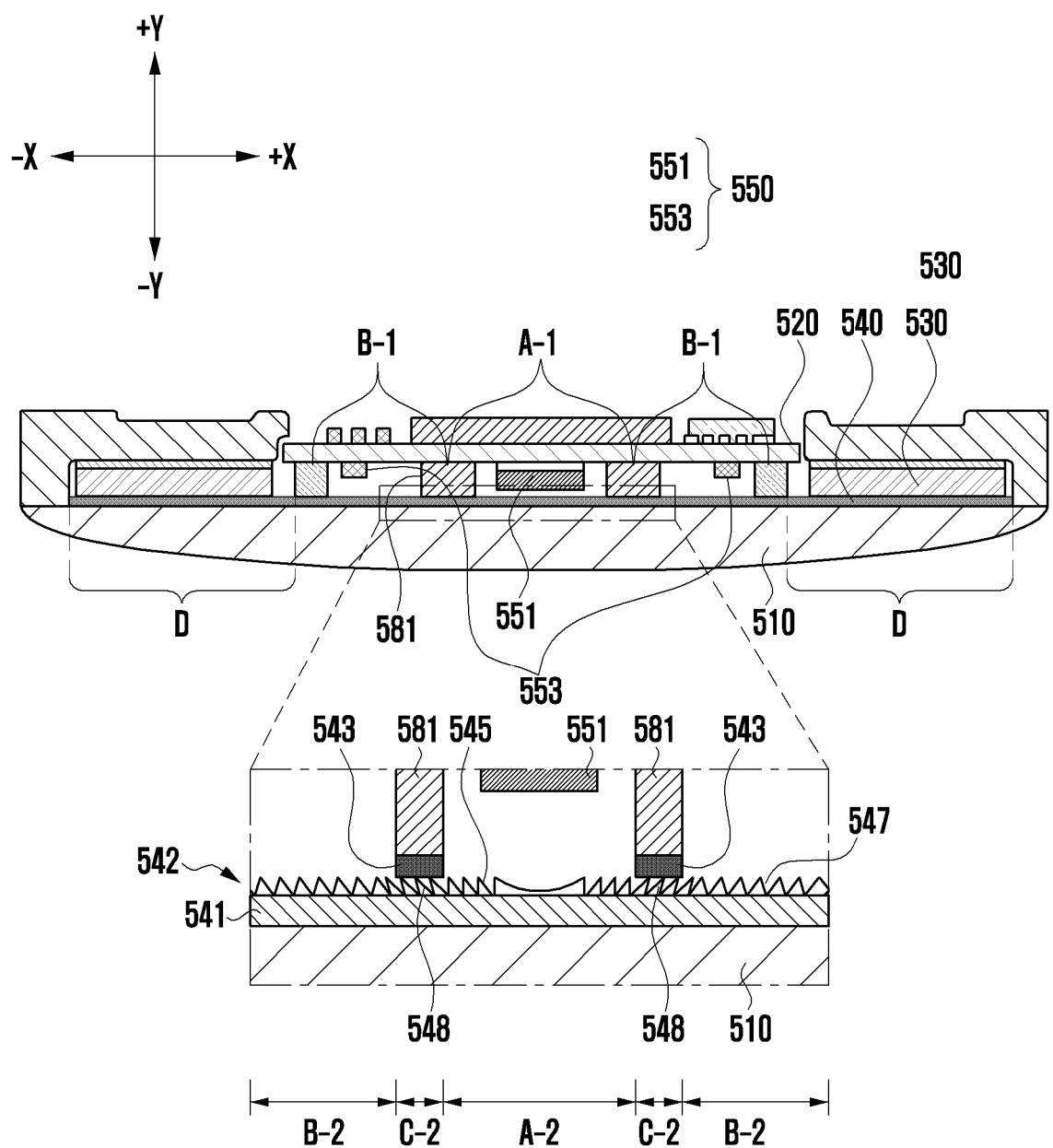
FIG. 6C is a cross-sectional view of the sensor module and the peripheral elements, taken along line A-A of FIG. 6A.

FIG. 6A is a view of a state in which a sensor module 550 and peripheral elements thereof are coupled to each other. FIG. 6B is an exploded perspective view of the sensor module 550 and the peripheral elements shown in FIG. 6A. FIG. 6C is a cross-sectional view of the sensor module 550 and the peripheral elements, taken along line A-A shown in FIG. 6A. Size ratios of the elements shown in the drawings are arbitrarily shown for convenience of explanation, and the size ratios of the elements may be changed.

An electronic device (e.g., the electronic device 101 of FIG. 1, the electronic device 200 of FIG. 2, or the electronic device 400 of FIG. 4) according to one or more embodiments disclosed herein may include a display (e.g., the display device 160 of FIG. 1 or the display 220 of FIG. 4), a processor (e.g., the processor 120 in FIG. 1), a cover 510 (e.g., the rear plate 493 in FIG. 4), a printed circuit board 520, a wireless charging coil 530 (e.g., the second antenna 455 of FIG. 4), and a sensor module 550. The printed circuit board 520 may be a flexible printed circuit board formed of a flexible material.

The display may transmit, for example, information processed by the wearable electronic device to a user. The display of the electronic device according to one or more embodiments disclosed herein may be the display device of FIG. 1 or the display of FIG. 4. The description for the display will be replaced by the description of the display device of FIG. 1 and the display of FIG. 4.

The cover 510 may be installed in the electronic device in a position facing the display. If the direction in which the display displays information in the electronic device is called the direction of the front surface of the electronic device, the cover 510 may be disposed or provided on the rear surface of the electronic device. As shown in FIG. 6C, the cover 510 may have a convex shape. If a side facing the printed circuit board 520 is the inner side of the cover 510 and the opposite side is the outer side of the cover 510, the outer side of the cover 510 may be convex. When an electronic device according to one or more embodiments disclosed herein is a type of electronic device worn on a wrist, the outer side of the cover 510 may be in contact with the wrist of a user. As shown in FIG. 6B, a light transmissive area 511 may be included in at least a part of the cover 510. The light transmissive area 511 may be formed of a light transmissive material. According to one or more embodiments, the cover 510 may be formed of a light transmissive material such as glass or transparent synthetic resin.

The sensor module 550 may be mounted on the printed circuit board 520. The sensor module 550 may include a light emitting unit 551 and light receiving units 553. According to one or more embodiments, the sensor module 550 may be a photoplethysmography (PPG) sensor module capable of detecting a biometric signal related to the user's heartbeat. In addition, the sensor module 550 may include a sensor for detecting various biometric signals.

The light emitting unit 551 may include a device capable of emitting light, such as a light emitting diode (LED) or an organic light emitting diode (OLED). In addition, the light emitting unit 551 may be configured of various elements capable of emitting light.

As shown in FIG. 6B, a plurality of light receiving units 553 may be provided to be arranged in a circle around the light emitting unit 551. The light receiving units 553 may include a light receiving element which converts light energy into electrical energy. For example, the light receiving units 553 may include a photo diode.

According to one or more embodiments, the sensor module 550 may use the difference in optical response according to the oxygen saturation of hemoglobin in the blood. Light provided from the light emitting unit 551 is transmitted to the user's body via the cover 510. The light receiving units 553 receive the reflected light transmitted to the body. The reflected light received by the light receiving units 553 has periodicity due to the above-described difference in optical response according to the oxygen saturation of hemoglobin. The sensor module 550 may detect a signal related to the user's heartbeat by using the periodicity. In some cases, a user's movement may be indirectly measured via a sensor (e.g., an acceleration sensor or a gyro sensor) which detects the position of the electronic device, and a heartbeat-related signal may be more precisely processed via the movement information. The biological signal detection of the sensor module 550 described above is the description of a representative principle of detecting heartbeat-related information using the light emitting unit 551 and the light receiving units 553, and the sensor module 550 according to one or more embodiments disclosed herein may detect the user's heartbeat-related information as a biometric signal in various other ways.

As described above, the sensor module 550 may use a phenomenon in which light produced by the light emitting unit 551 is reflected on the user's body and received by the light receiving units 553. In order to accurately and precisely detect a biometric signal, it may be desirable to suppress a phenomenon in which light produced by the light emitting unit 551 is transmitted to the light receiving units 553 without being reflected by the body. For example, it may be desirable to suppress a phenomenon in which light produced by the light emitting unit 551 proceeds in the +X-axis direction or the −X-axis direction in FIG. 6C. It may be desirable to suppress a phenomenon in which light produced from the light emitting unit 551 is reflected while passing via the base layer 541 or the cover 510 and transmitted to the light receiving units 553.

According to one or more embodiments, the electronic device may include a light blocking partition wall 581. The light blocking partition wall 581 may partition the area of the sensor module 550 into an area on which the light emitting unit 551 is mounted and an area on which the light receiving units 553 are mounted. The light blocking partition wall 581 may block a path in which light produced by the light emitting unit 551 is directly transmitted to the light receiving units 553 without being reflected by an external object. Hereinafter, the description will be made by defining the area (e.g., A-1 of FIG. 6C) on which the light emitting unit 551 is mounted as a light emitting area and defining the area (e.g., B-1 of FIG. 6C) on which the light receiving units 553 are mounted as a light receiving area.

Referring to FIG. 6B, the optical film 540 may be disposed or provided between the cover 510 and the sensor module 550 of the electronic device.

According to one or more embodiments, the optical film 540 may be configured to cover both the light emitting unit 551 and the light receiving units 553 of the sensor module 550. For example, the optical film 540 may be configured as a single sheet without being divided into a portion covering the light emitting unit 551 and a portion covering the light receiving units 553. By configuring the optical film 540 as a single sheet, it is possible to lower the manufacturing cost of the electronic device, increase the manufacturing yield, and secure mass productivity.

The optical film 540 may be attached to the cover 510 of the electronic device. The optical film 540 may be closely attached to the cover 510, and thus an air layer may not be formed between the optical film 540 and the cover 510. If a space exists to allow an air layer to be formed between the optical film 540 and the cover 510, due to the difference in refractive index between the optical film 540 and the air layer, the light produced by the light emitting unit 551 may be reflected between the optical film 540 and the air layer to travel in the X-axis direction of FIG. 6C. The light traveling in the X-axis direction of FIG. 6C may be transmitted to the light receiving units 553. In this way, when a phenomenon in which light produced by the light emitting unit 551 is incident to the light receiving units 553 along the extending direction of the optical film 540 or the cover 510 occurs, it may be difficult for the sensor module 550 to accurately measure biometric information. In the disclosure, by bringing the optical film 540 into close contact with the cover 510, it is possible to prevent an air layer from being formed between the optical film 540 and the cover 510. The difference in refractive index between the optical film 540 and the cover 510 is smaller than the difference in refractive index between the optical film 540 and the air layer, and thus light reflection between the optical film 540 and the cover 510 may be reduced.

As described above, the cover 510 may include the light transmissive area 511. The light produced by the light emitting unit 551 of the sensor module 550 may travel to the skin of a user via the light transmissive area 511 of the cover 510.

According to one or more embodiments, the pattern layer 542 of the optical film 540 may be divided into a plurality of areas. Different types of patterns may be of the plurality of areas of the pattern layer 542. For example, the pattern layer 542 may include a first area A-2 facing the light emitting unit 551 or a light emitting area A-1, a second area B-2 facing the light receiving units 553 or a light receiving area B-1, and a third area C-2 which is an area between the first area A-2 and the second area B-2. Different types of patterns may be of the first area A-2, the second area B-2, and the third area C-2.

According to one or more embodiments, as shown in FIG. 6B, the absorption layer 543 of the optical film 540 may be stacked or provided on the third area C-2 which is an area between the first area A-2 and the second area B-2 of the pattern layer 542. The absorption layer 543 may be formed of a material having high light absorption rate. Even if the light produced by the light emitting unit 551 travels along the optical film 540 or the cover 510, when the light is incident on the absorption layer 543, the light may not travel any further and may be absorbed by the absorption layer 543. The absorption layer 543 may suppress the movement of light in the X-axis direction of FIG. 6C. Referring to FIG. 6B, the absorption layer 543 may be stacked or provided on the pattern layer 542 between the light blocking partition wall 581 and the third area C-2. In an embodiment, the absorption layer 543 may be stacked or provided on a fourth area D which is an outer area of the second area B-2.

The pattern layer 542 of the optical film 540 may include at least one pattern (a first pattern 545, a second pattern 547, and a third pattern 548) protruding in the form of concentric circles having different diameters with respect to the surface of the pattern layer 542. The first pattern 545 may be of the first area A-2, the second pattern 547 may be of the second area B-2, and the third pattern 548 may be of the third area C-2. The first pattern 545, the second pattern 547, and the third pattern 548 may all be of different shapes.

In an embodiment, the first pattern 545 and the second pattern 547 may protrude in directions different from each other. The meaning that the protruding directions are different may indicate that protruding portions of the pattern protrude toward the center of the pattern layer 542 or protrude in a direction away from the center of the pattern layer 542. For example, the protruding portions of the first pattern 545 may protrude in a direction away from the center of the pattern layer 542, and the protruding portions of the second pattern 547 may protrude toward the center of the pattern layer 542.

The first pattern 545 may be formed such that light produced by the light emitting unit 551 travels in a first direction (e.g., the −Y-axis direction in FIG. 6C) substantially perpendicular to the extension direction of the pattern layer 542. The second pattern 547 may be formed such that the light reflected on the user's skin and incident on the second pattern 547 travels in a second direction opposite to the first direction (e.g., the +Y-axis direction in FIG. 6C) to be incident on the light receiving units 553. The first pattern 545 and the second pattern 547 formed to protrude from the pattern layer 542 in directions different from each other may reduce a phenomenon in which light produced by the light emitting unit 551 is directly incident to the light receiving units 553 without passing through a user's body. For example, the pattern layer 542 of the optical film 540 according to one or more embodiments disclosed herein may guide light produced by the light emitting unit 551 of the sensor module 550 to travel to the body of a user, and may guide the light reflected by the body of the user to be incident to the light receiving units 553 of the sensor module 550.

In an embodiment, the third pattern 548 may protrude in the same direction as that of the first pattern 545. For example, the third pattern 548 may be formed, like the first pattern 545, such that the protruding portions thereof protrude in a direction away from the center of the pattern layer 542.

In an embodiment, the third pattern 548 may be a pattern formed such that light incident to the third pattern 548 travels in the second direction (e.g., the +Y-axis direction of FIG. 6C). Referring to FIG. 6C, the absorption layer 543 may be disposed or provided in the second direction with respect to the third pattern 548. Light incident to the third pattern 548 may be guided to the absorption layer 543, and the light incident to the absorption layer 543 may be absorbed by the absorption layer 543. The third pattern 548 may guide incident light to the absorption layer 543 to reduce a phenomenon in which light moves in an extension direction (e.g., in the X-axis direction of FIG. 6C) of the cover 510.

Next, referring to FIGS. 7A and 7B, the pattern of the pattern layer will be described in more detail.

Figure 7A:
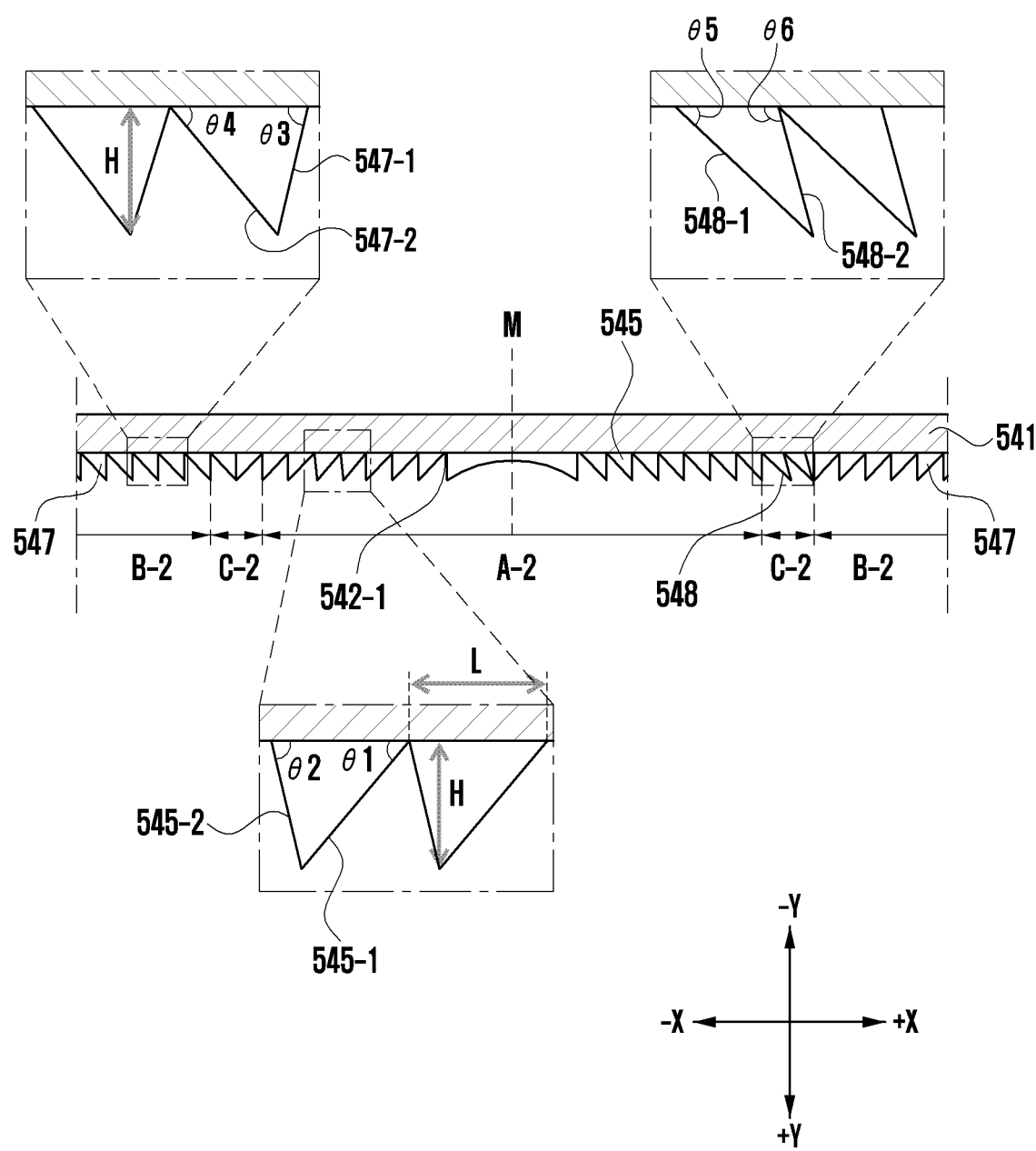
FIGS. 7A and 7B are views for explaining a pattern of a pattern layer of an optical film according to one or more embodiments disclosed herein.
Figure 7B:
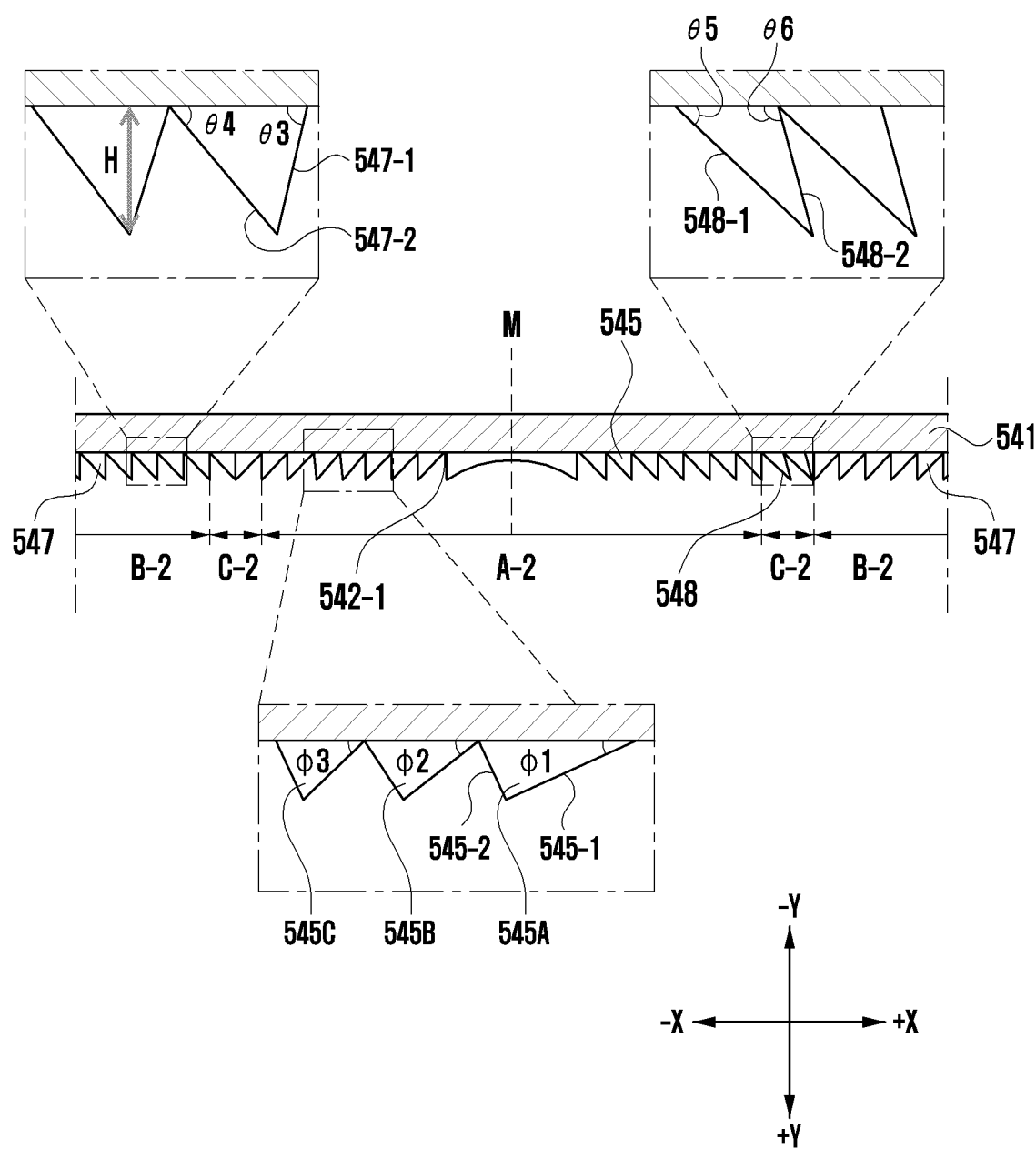
Figure 8:
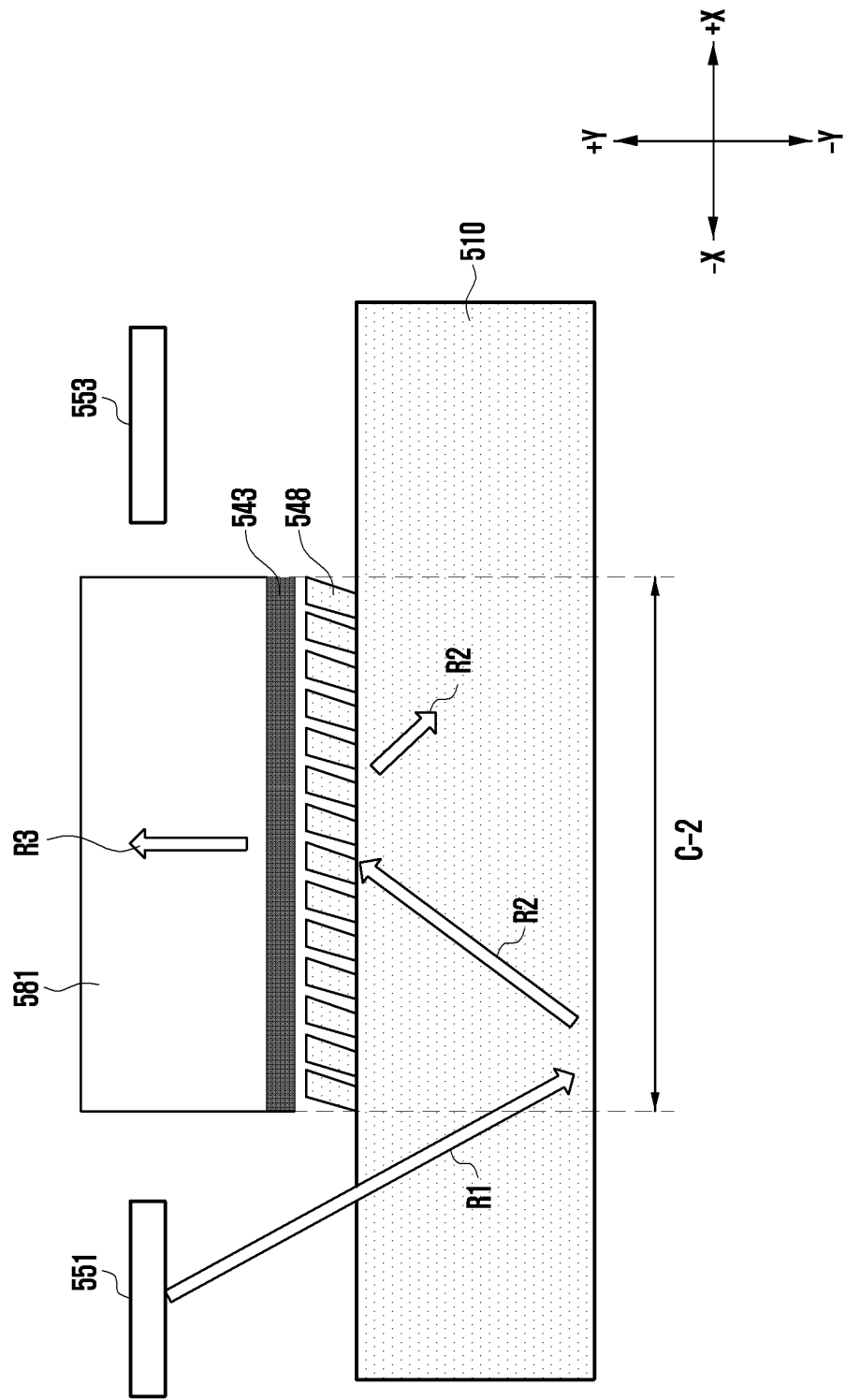
FIG. 8 is a view for explaining an effect of a third pattern according to one or more embodiments disclosed herein.

FIGS. 7A and 7B are views for explaining a pattern of a pattern layer according to one or more embodiments disclosed herein. FIG. 8 is a view for explaining an effect of a third pattern according to one or more embodiments disclosed herein.

Size ratios of elements shown in the drawings are arbitrarily shown for convenience of explanation, and the size ratios of the elements may be changed.

Referring to FIG. 7A, the first pattern 545 may include a first surface 545-1 and a second surface 545-2, respectively. The first surface 545-1 of the first pattern 545 may be a surface located closer to the center (M) of the pattern layer 542 than the second surface 545-2 of the first pattern 545, and the second surface 545-2 of the first pattern 545 may be a surface located farther from the center (M) of the pattern layer 542 than the first surface 545-1 of the first pattern 545. An angle θ1 formed between the first surface 545-1 of the first pattern 545 and a surface 542-1 of the pattern layer 542 may be smaller than an angle θ2 formed between the second surface 545-2 of the first pattern 545 and the surface 542-1 of the pattern layer 542. The angle θ2 formed between the second surface 545-2 of the first pattern 545 and the surface 542-1 of the pattern layer 542 may be 80 degrees or more and 95 degrees or less.

An angle between one side of the pattern and the surface 542-1 of the pattern layer 542 may be an angle inside the pattern or an angle outside the pattern. In the following description, an angle between the surface 542-1 of the pattern layer 542 and one surface of the pattern will be defined as an angle within the pattern.

A ratio of the width (L) of the first pattern 545 to the height (H) of the first pattern 545 may be 0.4 or more and 1.0 or less. The first pattern 545 of such a form may reduce a phenomenon in which, while light produced by the light emitting unit 551 is guided to travel in the first direction (e.g., the −Y-axis direction in FIG. 6B), the light produced by the light emitting unit 551 travels in a direction where the light receiving units 553 are arranged.

Referring to FIG. 7A, the second pattern 547 may include a first surface 547-1 and a second surface 547-2. The first surface 547-1 of the second pattern 547 may be a surface located closer to the center (M) of the pattern layer 542 than the second surface 547-2 of the second pattern 547, and the second surface 547-2 of the second pattern 547 may be a surface located farther from the center (M) of the pattern layer 542 than the first surface 547-1 of the second pattern 547. An angle θ3 formed between the first surface 547-1 of the second pattern 547 and the surface 542-1 of the pattern layer 542 may be larger than an angle θ4 formed between the second surface 547-2 of the second pattern 547 and the surface 542-1 of the pattern layer 542. The angle θ3 formed between the first surface 547-1 of the second pattern 547 and the surface 542-1 of the pattern layer 542 may be 80 degrees or more and 95 degrees or less. A ratio of the width (L) of the second pattern 547 to the height (H) of the second pattern 547 may be higher than or equal to 0.4 and lower than or equal to 1.0. The second pattern 547 of such a form may reduce a phenomenon in which, while the light reflected from the skin of the user is guided to travel in the second direction (e.g., the +Y-axis direction in FIG. 6B), the reflected light is incident again to the light emitting unit 551.

Referring to FIG. 7A, the third pattern 548 may include a first surface 548-1 and a second surface 548-2, respectively. The first surface 548-1 of the third pattern 548 may be a surface located closer to the center of the pattern layer 542 than the second surface 548-2 of the third pattern 548, and the second surface 548-2 of the third pattern 548 may be a surface located farther from the center (M) of the pattern layer 542 than the first surface 548-1 of the third pattern 548. As shown in FIG. 7A, an angle θ5 formed between the first surface 548-1 of the third pattern 548 and the surface 542-1 of the pattern layer 542 may be an acute angle. An angle θ6 formed between the second surface 548-2 of the third pattern 548 and the surface 542-1 of the pattern layer 542 may be an obtuse angle. The third pattern 548 of such a form may change the traveling direction of the light incident to the third pattern 548 to suppress a phenomenon in which light travels along the extension direction of the pattern layer.

Referring to FIG. 8, the light R1 produced by the light emitting unit 551 may travel to the cover 510 facing the light emitting unit 551. Due to the difference in refractive index of the surface 542-1 of the cover 510, some light R2 may be reflected from the surface 542-1 of the cover 510. The reflected light may be repeatedly reflected on the surface 542-1 of the cover 510 and move along the extension direction (e.g., the X-axis direction of FIG. 8). When the light moving along the extension direction of the cover 510 is incident to the light receiving units 553, it may be difficult to accurately measure biometric information.

In one or more embodiments disclosed herein, the third pattern 548 may be located in the third area C-2 between the first area A-2 facing the light emitting unit 551 and the second area B-2 facing the light receiving units. As shown in FIG. 8, the traveling direction of the light R2 incident to the third pattern 548 may be changed by the shape of the third pattern 548. The light R3 having passed through the third pattern 548 may travel in a direction (e.g., the +Y-axis direction of FIG. 8) in which the absorption layer 543 is disposed or provided. The light having traveled to the absorption layer 543 may be absorbed to the absorption layer 543. The light traveling along the extension direction of the cover 510 may be reduced or removed by the third pattern 548. The third pattern 548 may reduce a phenomenon in which light of the light emitting unit 551 is directly incident to the receiving units 553 to allow the sensor module (e.g., the sensor module 550 of FIG. 6C) to measure biometric information in designated quality. Unlike FIG. 7A, FIG. 8 shows that the tip of the third pattern 548 is not sharp, but the shape of the tip of the third pattern 548 may be changed in various ways.

FIG. 7B is a view for explaining a phenomenon of the first pattern 545 according to another embodiment disclosed herein.

Referring to FIG. 7B, the first pattern 545 may be formed such that an angle between the first surface 545-1 of the first pattern 545 and the surface 542-1 of the pattern layer 542 gradually decreases as the distance from the center (M) of the pattern layer 542 increases.

For example, referring to the enlarged portion of the first pattern 545 in FIG. 7B, an angle between the surface 542-1 of the pattern layer 542 and the first surface 545-1 of a (1-1)th pattern 545A which is relatively closer to the center (M) of the pattern layer 542 may be referred to as Φ1. An angle between the surface 542-1 of the pattern layer 542 and the first surface 545-1 of a (1-3)th pattern 545C which is relatively farther from the center (M) of the pattern layer 542 may be referred to as Φ3. An angle between the surface 542-1 of the pattern layer 542 and the first surface 545-1 of a (1-2)th pattern 545B between the (1-1)th pattern 545A and the (1-3)th pattern 545C may be referred to as Φ2 A relationship of Φ1<Φ2<Φ3 may be established.

An electronic device according to one or more embodiments disclosed herein may include a display, a cover (facing the display) and including a light transmissive area (in at least a part of the cover), a printed circuit board disposed or provided under the cover, a sensor module including a light emitting unit and a light receiving unit and disposed or provided on the printed circuit board to face the cover, and an optical film disposed or provided between the sensor module and the cover, wherein the optical film includes a base layer, a pattern layer stacked or provided on the base layer and including at least one pattern formed to protrude in directions different from each other, and an absorption layer formed of a material having a high light absorption rate to be stacked or provided on a partial area of the pattern layer.

In addition, patterns of the pattern layer of the optical film may protrude in forms of concentric circles having different diameters with respect to a surface of the pattern layer.

In addition, the pattern layer of the optical film may include a first area facing the light emitting unit of the sensor module, a second area facing the light receiving unit of the sensor module, and a third area which is an area between the first area and the second area, a first pattern of the first area and a second pattern of the second area may protrude in directions different from each other with respect to the surface of the pattern layer, and the first pattern and a third pattern of the third area may protrude in the same direction with respect to the surface of the pattern layer.

In addition, the absorption layer of the optical film may be stacked or provided on the third area of the pattern layer.

In addition, the absorption layer of the optical film may be stacked or provided on a fourth area which is an outer area of the third area of the pattern layer.

In addition, the first pattern of the pattern layer of the optical film may be formed such that light incident from the light emitting unit of the sensor module to the first pattern travels in a first direction substantially perpendicular to an extension direction of the pattern layer, the second pattern of the pattern layer of the optical film may be formed such that light incident to the second pattern travels in a second direction opposite to the first direction to be incident to the light receiving unit of the sensor module, and the third pattern of the pattern layer of the optical film may be a pattern formed such that light incident to the third pattern is guided to the absorption layer.

In addition, the first pattern of the pattern layer of the optical film may include a first surface and a second surface located farther from a center of the pattern layer than the first surface of the first pattern, respectively, an angle between the first surface of the first pattern and the surface of the pattern layer may be smaller than an angle between the second surface of the first pattern and the surface of the pattern layer, the second pattern of the pattern layer of the optical film may include a first surface and a second surface located farther from the center of the pattern layer than the first surface of the second pattern, respectively, an angle between the first surface of the second pattern and the surface of the pattern layer may be greater than an angle between the second surface of the second pattern and the surface of the pattern layer, the third pattern of the pattern layer of the optical film may include a first surface and a second surface located farther from the center of the pattern layer than the first surface of the third pattern, respectively, an angle between the first surface of the third pattern and the surface of the pattern layer may be an acute angle, and an angle between the second surface of the third pattern and the surface of the pattern layer may be an obtuse angle.

In addition, an angle between the first surface of the first pattern and the surface of the pattern layer may decrease as the distance between the first surface of the first pattern and the center of the pattern layer increases.

In addition, the electronic device may further include a light blocking partition wall formed to extend from the printed circuit board to the optical film to divide a light emitting area, in which the light emitting unit of the sensor module is mounted on the printed circuit board, and a light receiving area, in which the light receiving unit of the sensor module is mounted on the printed circuit board, the first area of the pattern layer of the optical film may face the light emitting area, the second area of the pattern layer of the optical film may face the light receiving area, and the third area may be in contact with the light blocking partition wall.

In addition, the absorption layer of the optical film may be stacked or provided between the light blocking partition wall and the pattern layer.

In addition, the optical film may be attached to be in close contact with the cover in order to prevent a space from being formed between the cover and the optical film.

An optical film according to one or more embodiments disclosed herein may include a base layer, a pattern layer stacked or provided on the base layer and including at least one pattern formed to protrude in directions different from each other, and an absorption layer formed of a material having high light absorption rate to be stacked or provided on a part of the pattern later.

In addition, patterns of the pattern layer may protrude in forms of concentric circles having different diameters with respect to the surface of the pattern layer.

In addition, the pattern layer may include a first area, a second area spaced apart from the first area, and a third area which is an area between the first area and the second area, a first pattern formed on the first area and a second pattern formed on the second area may protrude in directions different from each other with respect to the surface of the pattern layer, and the first pattern and a third pattern formed on the third area may protrude in the same direction with respect to the surface of the pattern layer.

In addition, the absorption layer may be stacked or provided on the third area of the pattern layer.

In addition, the absorption layer may be stacked or provided on a fourth area which is an outer area of the third area of the pattern layer.

In addition, the first pattern of the pattern layer may be formed such that light incident to the first pattern travels in a first direction substantially perpendicular to an extension direction of the pattern layer, the second pattern of the pattern layer may be formed such that light incident to the second pattern travels in a second direction opposite to the first direction, and the third pattern of the pattern layer may be a pattern formed such that light incident to the third pattern is guided to the absorption layer.

In addition, the first pattern of the pattern layer may include a first surface and a second surface located farther from a center of the pattern layer than the first surface of the first pattern, respectively, an angle between the first surface of the first pattern and the surface of the pattern layer may be smaller than an angle between the second surface of the first pattern and the surface of the pattern layer, the second pattern of the pattern layer may include a first surface and a second surface located farther from the center of the pattern layer than the first surface of the second pattern, respectively, an angle between the first surface of the second pattern and the surface of the pattern layer may be greater than an angle between the second surface of the second pattern and the surface of the pattern layer, the third pattern of the pattern layer may include a first surface and a second surface located farther from the center of the pattern layer than the first surface of the third pattern, respectively, an angle between the first surface of the third pattern and the surface of the pattern layer may be an acute angle, and an angle between the second surface of the third pattern and the surface of the pattern layer may be an obtuse angle.

In addition, an angle between the first surface of the first pattern and the surface of the pattern layer may decrease as the distance between the first surface of the first pattern and the center of the pattern layer increases.

The embodiments of the disclosure disclosed in the specification and drawings are only presented as specific examples to easily explain the technical content according to the embodiments of the disclosure and help understanding of the embodiments of the disclosure, and are not intended to limit the scope of the embodiments of the disclosure. Therefore, the scope of one or more embodiments of the disclosure should be construed to include all changes or modifications derived based on the technical idea of one or more embodiments of the disclosure, in addition to the embodiments disclosed herein.

What is claimed is:

1. An electronic device comprising:
   a display;
   a cover comprising a light transmissive area;
   a printed circuit board disposed between the display and the cover;
   a sensor module comprising a light emitting unit and a light receiving unit, the sensor module being disposed on the printed circuit board;
   a partition wall disposed on the printed circuit board and positioned between the light emitting unit and the light receiving unit; and
   an optical film disposed between the sensor module and the cover, the optical film comprising:
      a pattern layer including a first pattern positioned under the partition wall; and
      a first absorption layer disposed between the first pattern and the partition wall and including a material that absorbs light.

2. The electronic device of claim 1, wherein the pattern layer includes a second pattern at least partially facing the light emitting unit and a third pattern at least partially facing the light receiving unit.

3. The electronic device of claim 2,
   wherein the first pattern and the second pattern protrude in a same direction from a surface of the pattern layer, and
   wherein the second pattern and the third pattern protrude in a different direction from the surface of the pattern layer.

4. The electronic device of claim 2, wherein the first pattern, the second pattern and the third pattern of the pattern layer protrude in a form of concentric circles having different diameters from a surface of the pattern.

5. The electronic device of claim 2, wherein the optical film includes a second absorption layer disposed on the pattern layer at an outer area of the third pattern.

6. The electronic device of claim 2, wherein the first pattern of the pattern layer of the optical film is configured to guide first light to the first absorption layer,
   wherein the second pattern of the pattern layer of the optical film is configured to travel second light in a first direction substantially perpendicular to an extension direction of the pattern layer, the second light being incident from the light emitting unit of the sensor module to the second pattern, and
   wherein the third pattern of the pattern layer of the optical film is configured to travel third light in a second direction opposite to the first direction, the second light being incident from the light emitting unit of the sensor module to the third pattern.

7. The electronic device of claim 6, wherein the first pattern of the pattern layer of the optical film comprises:
   a first surface, and
   a second surface located farther from a center of the pattern layer than the first surface of the first pattern,
   wherein an angle between the first surface of the first pattern and a surface of the pattern layer is an acute angle,
   wherein an angle between the second surface of the first pattern and the surface of the pattern layer is an obtuse angle,
   wherein the second pattern of the pattern layer of the optical film comprises:
   a first surface, and
   a second surface located farther from the center of the pattern layer than the first surface of the second pattern,
   wherein an angle between the first surface of the second pattern and the surface of the pattern layer is smaller than an angle between the second surface of the second pattern and the surface of the pattern layer,
   wherein the third pattern of the pattern layer of the optical film comprises:
   a first surface, and
   a second surface located farther from the center of the pattern layer than the first surface of the third pattern, and
   wherein an angle between the first surface of the third pattern and the surface of the pattern layer is greater than an angle between the second surface of the third pattern and the surface of the pattern layer.

8. The electronic device of claim 7, wherein the angle between the first surface of the first pattern and the surface of the pattern layer decreases as a distance between the first surface of the first pattern and the center of the pattern layer increases.

9. The electronic device of claim 1, wherein the optical film is attached to be in contact with the cover in order to prevent a space from being formed between the cover and the optical film.

* * * * *